United States Patent [19]

Wheadon

[11] Patent Number: 5,074,134
[45] Date of Patent: Dec. 24, 1991

[54] LOCKABLE ADJUSTMENT MECHANISM

[75] Inventor: Andrew P. Wheadon, Copnor, England

[73] Assignee: Vickers Systems Limited, England

[21] Appl. No.: 498,101

[22] Filed: Mar. 23, 1990

[30] Foreign Application Priority Data

Mar. 30, 1989 [GB] United Kingdom ............... 8907144

[51] Int. Cl.$^5$ ............................................. F16K 35/10
[52] U.S. Cl. ........................................ 70/175; 70/178;
70/189; 70/231; 70/232; 70/DIG. 59;
137/384.2; 251/297
[58] Field of Search ............... 70/DIG. 59, DIG. 57,
70/218, 188, 189, 466, 165, 140, 175-180, 229,
231, 232, 422, 327, 328; 137/384.2; 251/297

[56] References Cited

U.S. PATENT DOCUMENTS

| | | | |
|---|---|---|---|
| 1,169,906 | 2/1916 | Anderson | 70/180 |
| 1,515,745 | 11/1924 | Mulrooney et al. | 251/297 |
| 1,515,998 | 11/1924 | Clark | 251/297 |
| 1,545,712 | 7/1925 | Toy | 70/175 |
| 1,625,657 | 4/1927 | Henke, Jr. | 70/232 |
| 1,645,917 | 10/1927 | Maszczyk | 70/231 |
| 1,701,816 | 2/1929 | Malluk et al. | 70/165 |
| 1,783,971 | 12/1930 | Miquet | 70/230 |
| 1,970,660 | 8/1934 | Fever | 70/231 |
| 3,625,479 | 12/1971 | Hammon | 251/297 X |
| 3,827,671 | 8/1974 | Bolden et al. | 251/297 X |
| 4,620,428 | 11/1986 | Kopesky | 70/175 |

Primary Examiner—Lloyd A. Gall
Attorney, Agent, or Firm—Barnes, Kisselle, Raisch, Choate, Whittemore & Hulbert

[57] ABSTRACT

A lockable adjustment mechanism (1) for an adjustable component (2), the adjustment mechanism (1) comprising a first rotatable body portion (3) adapted in use to receive and be attached to a threaded elongated adjustment member (4) of the adjustable component (2), a second non-rotatable body portion (5) attachable to the adjustable component (2) and through which the threaded adjustment member in use passes, means (7, 9) for retaining a selected relative position between the first and second body portions, a third body portion (13) rotatably mounted on the first body portion (3) and lock means (17) operable to lock the third body portion (13) to the first body portion (3), rotation of the third body (13) effecting rotation of the first body portion (3) when locked thereto and thus effecting longitudinal movement of the adjustment member (4) of the adjustable component (2), the third body portion (13) being freely rotatable when not locked to the frist body portion (3) so as not to have any effect on the setting of the adjustment member (4).

3 Claims, 4 Drawing Sheets

LOCKABLE ADJUSTMENT MECHANISM

BACKGROUND OF THE INVENTION

1. Field of the Invention

This invention relates to lockable adjustment mechanisms for adjustable components. The invention has been conceived in relation to flow control valves, and will primarily be discussed in relation thereto but it is to be understood that it is applicable to a wide range of adjustable components.

2. Description of the Prior Art

Flow control valves typically have an adjustment member extending therefrom which may be part of a needle valve or a piston arrangement, for example, the adjustment mechanism being cooperable therewith in order to set the valve as required, and also being lockable so as to prevent inadvertent interference with a selected setting. Known adjustment mechanisms have comprised a special two-part adaptor, a first part thereof being screwed or otherwise attached to the valve, and a second part thereof adapted to receive the lockable adjuster The second part comprises an adjustment member for the valve which replaces the normal adjustment member of the valve. Thus the replacement adjustment member has to be tailored to the type of valve being converted and hence is relatively expensive. As will be appreciated from the foregoing, the disadvantage of this known arrangement is that the adaptor adds considerably to the basic cost of the adjustment mechanism and furthermore, the size of adaptor has to be selected to suit the component to which the lockable adjustment mechanism is to be fitted. The adaptor also increases the overall length of the adjustment mechanism and this can be problematical if space is at a premium. Furthermore, the fitting time is relatively high in view of the fact that the normal valve adjustment member has to be replaced.

The object of the present invention is to provide a universal lockable adjustment mechanism for adjustable components and to reduce the cost of manufacture thereof.

SUMMARY OF THE INVENTION

According to the present invention there is provided a lockable adjustment mechanism for an adjustable component, the adjustment mechanism comprising a first rotatable body portion adapted in use to receive and be attached to a threaded, elongated adjustment member of the adjustable component, means operable in use to retain a selected position of the first body portion relative to the adjustable component, a second body portion rotatably mounted on the first body portion, and lock means operable to lock the second body portion to the first body portion, rotation of the second body portion effecting rotation of the first body portion when locked thereto and thus effecting longitudinal movement of the adjustment member of the adjustable component relative to the adjustable component, the second body portion being freely rotatable when not locked to the first body portion so as not to have any effect on the setting of the adjustment member.

BRIEF DESCRIPTION OF THE DRAWINGS

An adjustment mechanism for an adjustable component will now be described in greater detail, by way of example, with reference to the accompanying drawings, in which.

DESCRIPTION OF THE PREFERRED EMBODIMENTS

Figure 1:
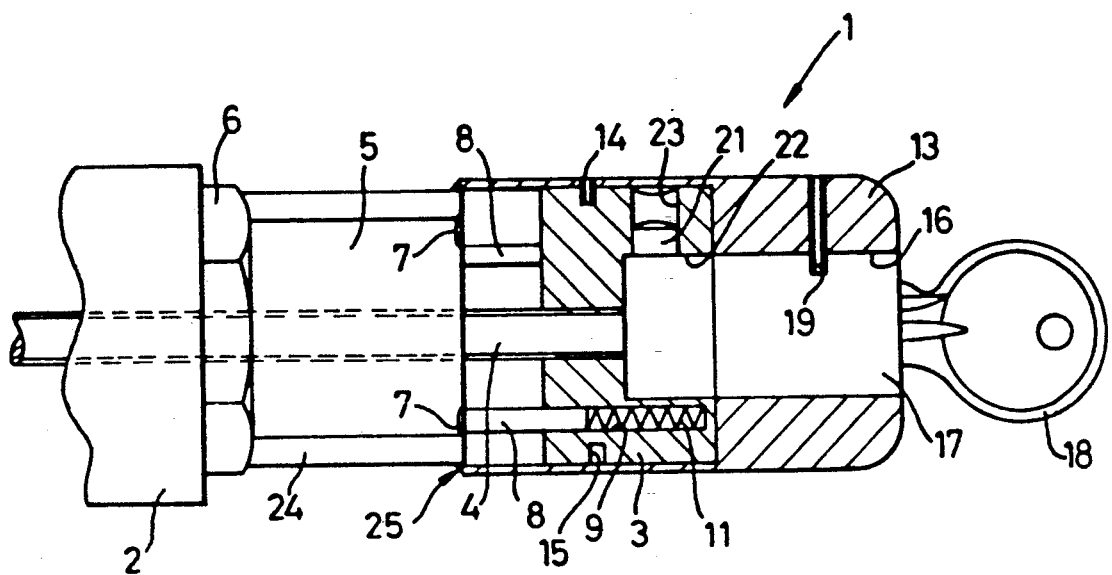
FIG. 1 is a side view, partly in section, of the adjustment mechanism shown attached to an adjustable component.

The adjustment mechanism is indicated generally at 1 and is shown attached to the end of a flow control valve which is only partly shown at 2. The adjustment mechanism 1 comprises a first rotatable body portion 3 which is adapted to receive a threaded adjustment member 4 forming part of the flow control valve 2 and being part of a needle valve arrangement thereof, longitudinal movement of the adjustment member 4 serving to open or close the needle valve, according to the direction of movement. The adjustment member 4 is attached to the first body portion 3 by a grub screw (not shown) and is also threadedly received by a portion 5 of the valve 2 through which it passes. A plurality of equispaced shallow recesses or detents 7 are provided on the end face of the portion 5, the detents 7 being on a circle and adapted to receive the ends of respective ones of a similar plurality of pins 8 which are mounted in apertures 9 in the first body portion 3 and are urged towards the portion 5 by springs 11. The outer ends of the pins 8 are rounded to facilitate axial movement thereof against the action of the respective springs 11 on rotation of the first body portion 3 relative to the portion 5.

A second body portion 13 is provided in a form of a thimble which fits over the first body portion 3 and is rotatable with respect to the latter. The thimble 13 is retained axially by a pin 14 which engages a peripheral slot 15 in the first body portion 3. The thimble 13 is provided with a central aperture 16 which receives a barrel lock 17 provided with a key 18 and secured within the thimble 13 by a roll pin 19. The lock 17 is of the type having a radially movable locking pin 21 which either lies retracted within the body of the lock or extends radially therefrom as shown in the drawings. It will be seen that the lock 17 extends through the aperture 16 in the end of the thimble 13 and into an aperture 22 provided in the outer end of the first body portion 3. The first body portion 3 is also provided with a radial aperture 23 adapted to receive the locking pin 21 when the latter is in the extended or locking position. It will be appreciated that when the locking pin 21 is retracted, then the thimble 13 is freely rotatably on the first body portion 3 so that rotation thereof does not result in any longitudinal movement of the adjustment member 4 and thus has no effect on the setting of the flow control valve 2. In the retracted position of the locking pin 21 the key 18 is removable from the lock so that inadvertent interference with the setting of the control valve 2 is prevented. When the key 18 is inserted into the lock and turned, then the locking pin 21 will move to the extended or locking position, once it is in alignment with the radial aperture 23 in the first body portion 3, such alignment being achieved by rotation of the thimble 13 relative to the first body portion 3.

Figure 2:
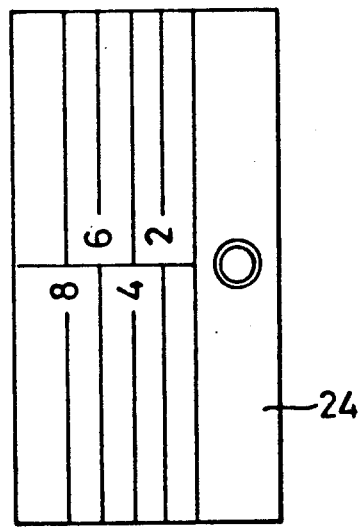
FIG. 2 is a side view of a component of FIG. 1, FIGS. 3 and 4 show the adjustment mechanism of FIG. 1 applied to different adjustable components.

The portion 5 of the valve is provided with a micrometer ring 24 which is shown in greater detail in FIG. 2 of the drawings. The outer edge of the thimble 13 is bevelled at 25 and provides the means for reading off the micrometer ring 24 the setting of the flow control valve 2.

In use of the adjustment mechanism illustrated in FIGS. 1 and 2 of the drawings, it is merely attached to the valve 2 without the need for any special adapter which has been required in the past, the mechanism receiving the threaded adjustment member 4 and being secured to the first body portion 3 by the grub screw previously referred to and not shown in the drawings. As already described, with the key 18 removed from the lock 17, the locking pin is retracted into the body of the lock and thus the thimble 13 is freely rotatable on the first body portion 3 so that the setting of the valve cannot be interfered with. Once the setting of the valve needs to be adjusted, then the key 18 is inserted into the lock, the thimble 13 rotated until the locking pin 21 is in alignment with the aperture 23 in the first body portion 3 and the key then turned to extend the locking pin and thus lock the thimble 13 to the first body portion 3. Thus, on rotation of the thimble 13, the body portion 3 also rotates and carries with it the adjustment member 4 so that the latter moves longitudinally in a direction determined by the direction of rotation of the thimble 13. The thimble 13 and the first body portion 3 also move axially or longitudinally with the adjustment member 4 and thus the edge 25 of the thimble 13 moves over the scale on the micrometer ring 24 and indicates the setting of the valve. During this rotation of the first body portion 3, the pins 8 ride over the end face of the portion 5 of the valve and when the required valve setting has been reached the thimble 13 need only be turned slightly in one direction or the other in order to ensure that the pins 8 engage the detents 7 in the portion 5. It will be appreciated that the resolution of the adjustment mechanism in this respect depends on the number of pins 8 and corresponding detents 7 employed. The engagement of the pins 8 with the detents 7, locks the first body portion 3 against inadvertent rotation due to vibration, for example. Once the required adjustment of the valve 2 has been achieved, the key 18 is turned so as to retract the locking pin 21 from the first body portion 3 and thus allow once again the thimble 13 to rotate freely on the first body portion. It will be appreciated that the pins 8 and springs also accommodate relative axial movement between the thimble 13 and body portion 3, and the body portion 5 as well as providing part of the detent mechanism.

Figure 3:
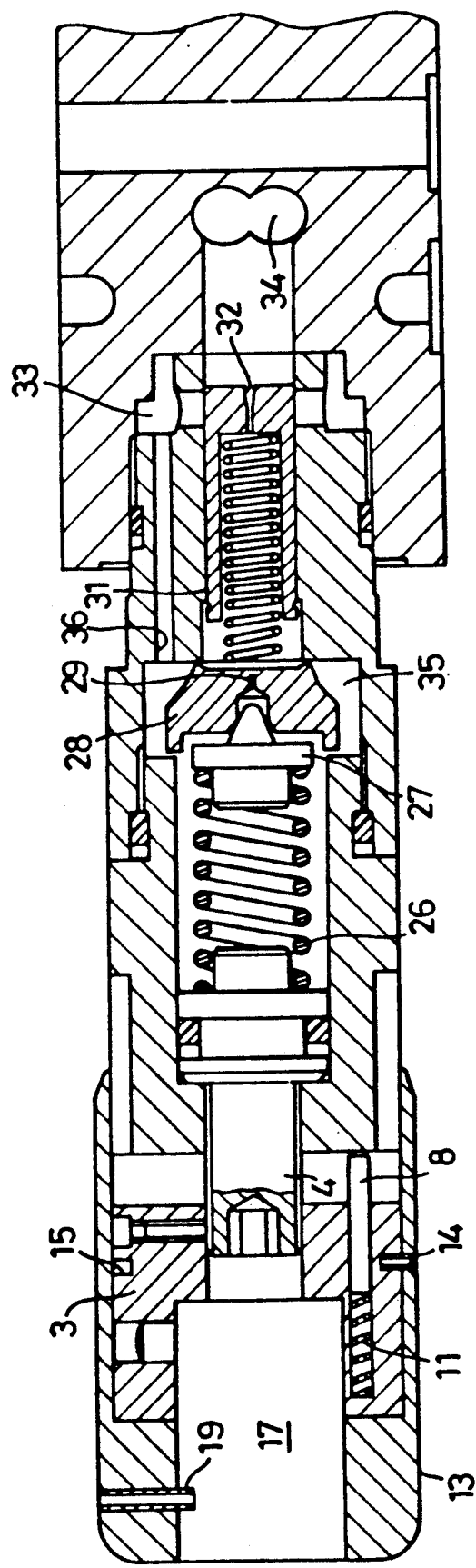
Figure 4:
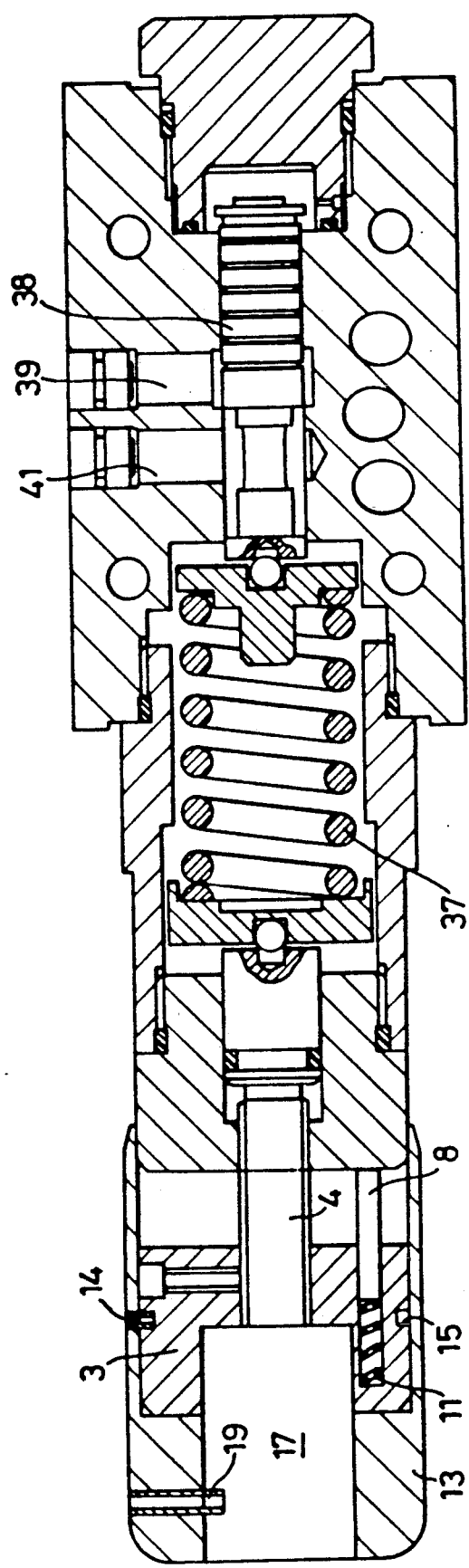

FIGS. 3 and 4 of the drawings show the adjustment mechanism of FIG. 1 applied to two different types of flow control valve. FIG. 3 shows the adjustment mechanism applied to a conventional relief valve. The adjustment member 4 acts on a spring 26 which determines the opening pressure of a poppet valve 27, the seat 28 has a bleed orifice 29 which connected with the interior of a spring-loaded main spool 31 which is also provided with a bleed orifice 32 at its otherwise closed end. The relief valve is shown in the normal operating condition in which the spool 31 blocks a tank port 33 from pressure fluid flowing through the pressure port 34. The tank port 33 is connected to the chamber 35 housing the poppet valve 27 by a drilling 36. When the pressure in the fluid flowing through the valve exceeds that set by the adjustment mechanism, first the poppet valve 27 opens whereby pressure fluid is bled to tank 34 via the drilling 36 and then the resulting reduction in pressure at the left-hand end of the spool 31 allows the spool to move to the left and thus open the tank port 33 directly to the pressure fluid.

FIG. 4 shows the adjustment mechanism applied to a conventional pressure reducing valve in which the adjustment member 4 sets a spring 37 acting on one end of a spool 38. The valve is provided with a main pressure port 39 and a reduced pressure port 41, the two normally being interconnected by the spool 38. A drilling (not shown) connects the chamber housing the spring 37 to tank, and another drilling (also not shown) connected the reduce pressure port 41 to the right-hand end of the spool 38. When the pressure increases to a level to overcome the action of the spring 37, the spool moves to the left to block the main pressure port 39 and opens the reduced pressure port 41 to tank.

It will be seen that the adjustment mechanism of the present invention is a relatively simple device which is readily fitted to a component to be adjusted without the need for special adaptors or replacement adjustment member and thus provides a significant improvement in the art. The component count is relatively low and shows a saving of some 60% over known adjustment mechanisms.

Figure 5:
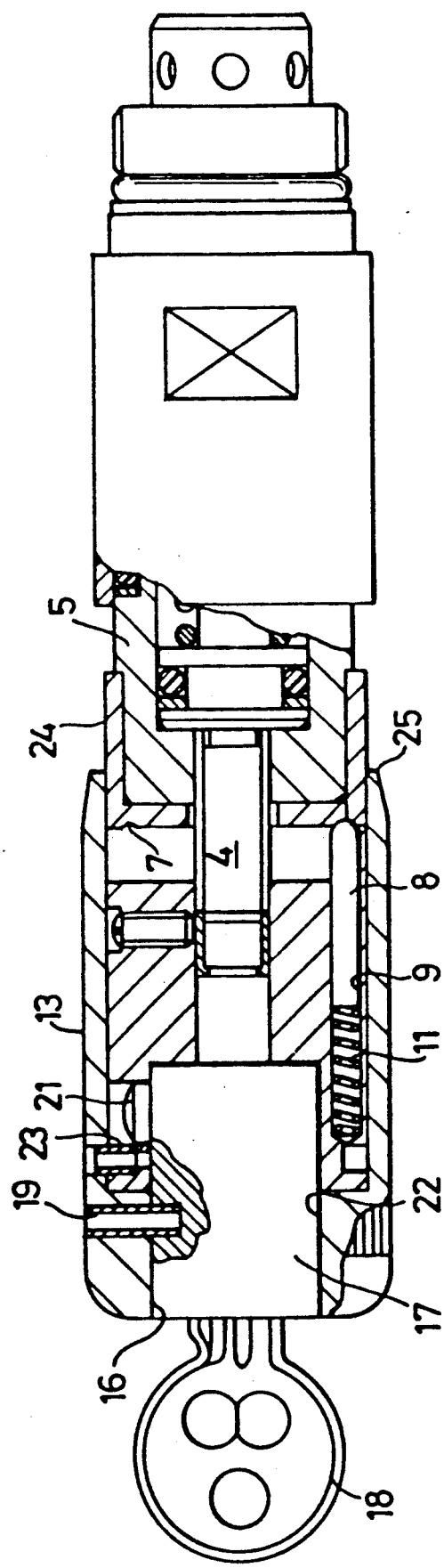
FIG. 5 is a side view, partly in section of an alternative embodiment.

It will be understood that modifications can be made to the embodiments illustrated in the drawings. For example, the type of lock 17 employed need not be of the illustrated type but can be of any form, provided it serves to lock the thimble 13 to the first body portion 3 when required. Furthermore, the detents 7 could be provided on the end face of the micrometer ring 24 rather than in the end face of the portion 5 of the adjustment component. This is illustrated in FIG. 5 in which like components have been given similar reference numerals. In this embodiment, the micrometer ring 24 is in the form of a sleeve which fits over the portion 5 of the adjustment component, the detents 7 being formed in the end of the micrometer sleeve, with the pins 8 and springs 11 being provided in the first body portion 3 as before.

I claim:

1. A lockable adjustment mechanism for an adjustable component, the adjustment mechanism comprising a first rotatable body portion adapted in use to receive and be attached to a threaded elongated adjustment member of the adjustable component, a second body portion rotatably mounted on the first body portion, lock means operable to lock the second body portion to the first body portion, rotation of the second body portion effecting rotation of the first body portion when locked thereto and thus effecting longitudinal movement of the adjustment member of the adjustable component, a micrometer ring in relation to which said second body portion is movable, recesses formed in an end face of said micrometer ring, and retaining means operable in use to retain a selected position of the first body portion relative to the adjustable component, said retaining means comprising a plurality of spring-loaded pins carried by said first body portion and cooperable with respective ones of said recesses and said micrometer ring end face, said second body portion being freely rotatable when not locked to said first body portion so as to not have any effect on the setting of said adjustment member.

2. An adjustment mechanism according to claim 1, wherein the lock means is of the barrel type and comprises a locking pin movably generally radially of the lock means and engageable with a radial aperture provided in the first body portion.

3. An adjustment mechanism according to claim 1 or 2, wherein the second body portion is restrained from axial movement relative to the first body portion when being freely rotatable on the latter.

* * * * *